R. M. CRAIG.
MOUNTING FOR WHEELS.
APPLICATION FILED JULY 25, 1913.
1,112,268.
Patented Sept. 29, 1914.
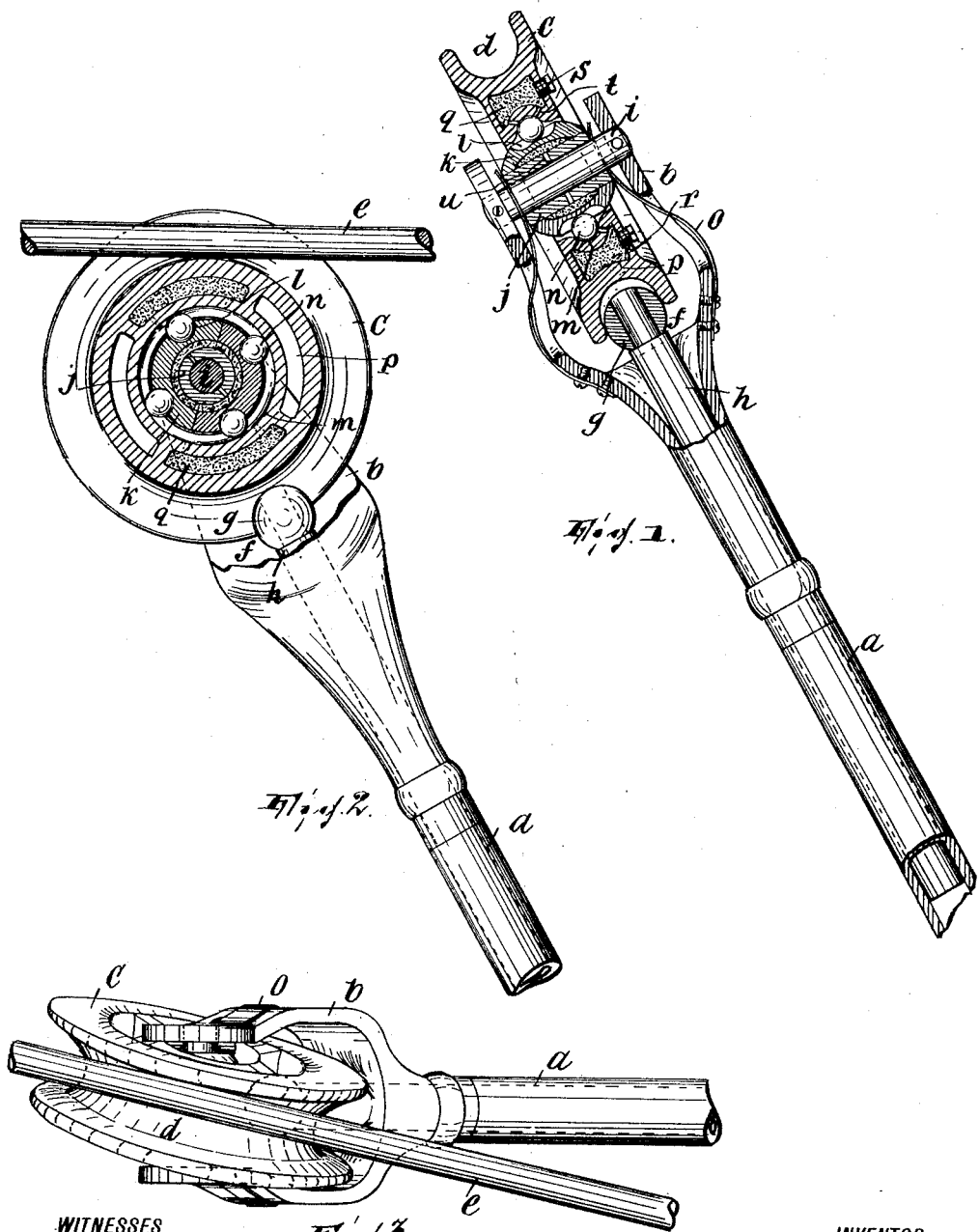
WITNESSES
INVENTOR,
Robert M. Craig,
BY
ATTORNEY.

UNITED STATES PATENT OFFICE.

ROBERT M. CRAIG, OF PATERSON, NEW JERSEY, ASSIGNOR OF ONE-HALF TO SAMUEL MULHOLLAND, OF PATERSON, NEW JERSEY.

MOUNTING FOR WHEELS.

1,112,268.  Specification of Letters Patent.  Patented Sept. 29, 1914.

Application filed July 25, 1913. Serial No. 781,108.

*To all whom it may concern:*

Be it known that I, ROBERT M. CRAIG, a citizen of the United States, residing at Paterson, in the county of Passaic and State of New Jersey, have invented certain new and useful Improvements in Mountings for Wheels, of which the following is a specification.

This invention relates to trolley poles, and it has for its object to provide a trolley pole with a rotary contact member or wheel which shall be capable of adjusting itself readily to bends or curves in the wire, whereby to reduce the tendency of the wheel to become unshipped from the wire.

A further object of the invention is to journal the wheel so that it shall rotate substantially without friction.

In accordance with this invention, the trolley pole has a wheel supporting member which forms with the wheel, which it penetrates centrally, a ball and socket joint, and the pole further has means to hold the wheel at one point radially thereof against lateral displacement. In the preferred construction, the device is constructed so as to augment the freedom of the wheel in adjusting itself to the path it should travel in order to be retained in engagement with the wire and so as to reduce the friction substantially to the minimum, thereby substantially eliminating lubrication, and so as to simplify and cheapen and facilitate the assembly of the various parts.

In the accompanying drawing, Figure 1 is a front elevation, showing the wheel-including portion of the trolley pole; Fig. 2 is a side elevation of the pole and wire, the wheel-including portion of the pole being shown in section in a plane at right angles to the plane of the section in Fig. 1; and, Fig. 3 is a plan of the improved pole and the trolley wire.

The pole proper $a$ of the improved trolley pole has the usual fork or harp $b$.

$c$ is the trolley wheel having the usual circumferential groove $d$ to receive the trolley wire $e$.

The improved trolley pole has its wheel $c$, as stated, carried by a wheel-supporting member which forms with the wheel, which it penetrates centrally, a ball and socket joint. This will appear in the following detailed description of parts not so far specifically mentioned. By virtue of this ball and socket joint it will be seen that with reference to said supporting member the wheel has movement into any of an infinite variety of planes all of which have one point in common, *i. e.*, the center of such joint. As between the pole proper and the wheel, however, it is necessary that the wheel should be confined against lateral movement with respect to some eccentric point thereof, since otherwise, due to the ability of the wheel to shift around the center of the ball and socket joint, the wheel, under the upward pressure of the pole, would stand undesirably canted one way or the other. I therefore provide the improved pole with the wheel-confining device $f$, preferably a ball $g$ journaled on a stud $h$ whose axis in the present case is in a radius of the center aforesaid and is coincident with the axis of the pole proper, being suitably fixed therein. In this way, the wheel is always kept upright, and yet it is free to shift around the center of the ball and socket joint to accommodate itself to departures of the trolley wire out of vertical coincidence with the longitudinal axis of the pole (Fig. 3).

The aforesaid supporting member may be afforded as follows: $i$ is an arbor traversing and fixed in the fork $b$. On this arbor is fitted a split sleeve $j$. On the sleeve is fitted a spherical member $k$ having transverse grooves $l$ struck around the center of the member $k$, which is formed in two parts, as shown in Fig. 2. The wheel $c$ has an interior circumferential groove $m$ and in this groove and the grooves $l$ are snugly fitted anti-friction balls $n$. The axial length of the members $j$ and $k$ is less than that of the distance between the adjoining faces of the fork $b$ so that, in accordance with the preferred construction, they may be allowed some lateral movement, such being however opposed by yielding means in the form of plate springs $o$ engaging their ends and suitably fixed to the pole proper.

If desired, the wheel may be cast with a concentric chamber $p$ for receiving a viscous lubricant $q$, the chamber having suitable filling orifices $r$ provided with screw plugs $s$; $t$ denotes ports leading from said chamber to the ball race or groove $m$.

In the present instance member $k$ may rotate on member $j$ and member $j$ on member $i$, wherefore member $k$ is formed hollow to receive a packing of lubricant as shown and member *j* has ports *u* leading to its bore.

Having thus fully described my invention, what I claim as new and desire to secure by Letters Patent is:—

1. A trolley pole having in combination a trolley-wheel-supporting member and a trolley-wheel, said member penetrating the wheel centrally and forming therewith and interiorly thereof a ball and socket joint, said pole having means to hold the wheel at one point thereof, eccentrically, against lateral displacement, substantially as described.

2. In combination, the pole proper, a trolley-wheel-supporting member arranged therein and having transverse grooves formed therein and extending concentrically, balls in said grooves, a trolley wheel receiving said member centrally thereof and having an interior circumferential groove occupied by the balls, and means on the pole proper to hold the wheel at one point thereof, eccentrically, against lateral displacement, substantially as described.

3. A trolley pole having in combination a laterally yielding trolley-wheel-supporting member and a trolley-wheel, said member penetrating the wheel centrally and forming therewith and interiorly thereof a ball and socket joint, said pole having means to hold the wheel at one point thereof, eccentrically, against lateral displacement, substantially as described.

4. A trolley pole having in combination, a trolley-wheel-supporting member and a trolley-wheel, said member penetrating the wheel centrally and forming therewith and interiorly thereof a ball and socket joint, said pole having means to hold the wheel at one point thereof approximately opposite the wire-contacting point of the wheel against lateral displacement, substantially as described.

In testimony whereof I affix my signature in presence of two witnesses.

ROBERT M. CRAIG.

Witnesses:
JOHN W. STEWARD,
WM. D. BELL.

---

Copies of this patent may be obtained for five cents each, by addressing the "Commissioner of Patents, Washington, D. C."